May 25, 1937.  V. JANTSCH  2,081,237

PROPELLER SHAFT CENTER BEARING

Filed Feb. 17, 1936

Inventor
Victor Jantsch

By Blackmore, Spencer & Flint
Attorneys

Patented May 25, 1937

2,081,237

UNITED STATES PATENT OFFICE 2,081,237

PROPELLER SHAFT CENTER BEARING

Victor Jantsch, Pontiac, Mich., assignor, by mesne assignments, to Yellow Truck and Coach Manufacturing Company, Pontiac, Mich., a corporation of Maine Application February 17, 1936, Serial No. 64,326

7 Claims. (Cl. 180—70)

This invention relates to motor vehicles and more particularly to an improved center bearing for a sectional propeller shaft between the engine and the drive axle.

Long wheel base vehicles having a drive axle in the rear and an engine in the front, are often provided with two or more power shafts arranged end to end and connected by a universal joint and, therefore, one or more intermediate shaft supports are necessary. The present invention aims to simplify the intermediate mounting for reducing cost and facilitating manufacture and assembly, and also to provide an assembly which eliminates the need for extreme accuracy in fitting the parts and which in use cushions operating stress, and thereby reduces breakage and wear and gives to the cooperating parts a long life free from special care and attention.

Another object of the invention is to prolong the life of the relatively movable bearing surfaces by providing an assembly having a double guard for excluding dirt and water therefrom.

A further object is to provide an anti-friction bearing having its inner race cooperatively associated with and secured to parts of the propeller shaft, and its outer race fixed within a dependent frame bracket through a yieldable connection, which offers sufficient resistance against displacement to guard against whipping of the shaft at high speed, but which, because of its resilience, is capable of distortion to accommodate slight angular movements and thereby relieve the parts from severe stress upon weaving or twisting of the chassis frame members incident to travel over rough roads.

Figure 1:
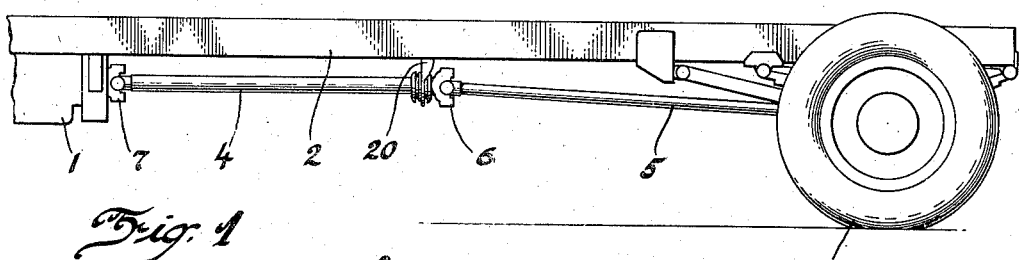
Figure 2:
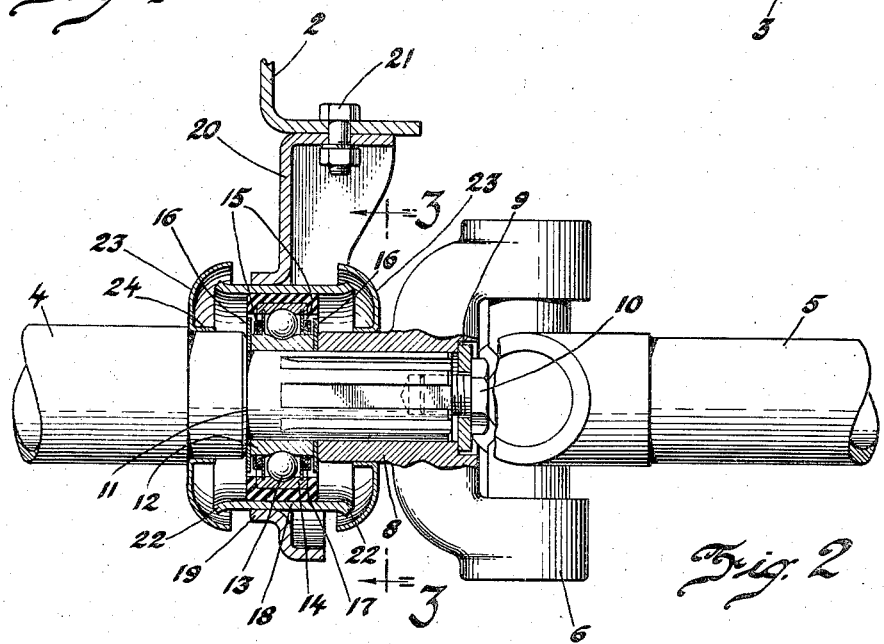
Figure 3:
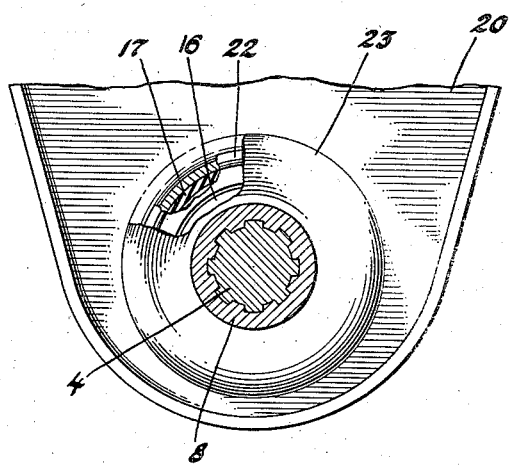

The invention will be best understood upon reference to the accompanying drawing wherein Figure 1 is a side elevation of a portion of a motor vehicle embodying the invention; Figure 2 is an enlarged sectional view of the center bearing construction, and Figure 3 is a section taken on line 3—3 of Figure 2.

In Figure 1 of the drawing the rear portion of an engine 1 is shown mounted in the forward end of a chassis frame 2 and the chassis frame is supported through the usual springs upon a drive axle having road wheels 3 at opposite ends. A pair of propeller shaft sections 4 and 5, arranged in series, transmit power from the engine to the rear wheels, and to accommodate relative angular movement, the shafts are connected at adjacent ends by a universal joint 6. In this case the center bearing support is associated with the rear end of the forward shaft section 4 and to lessen the imposition of frame weaving strains on the center bearing structure the forward end of the shaft section 4 is connected by a universal joint 7 with the power output shaft of the engine or power unit 1.

Referring to the detail structure of the center bearing support, as shown in Figure 2, the forward fork of the universal joint 6 includes the customary coupling sleeve 8 secured on the splined end of the shaft 4 by means of a washer 9 and a stud 10 threadably engaged in an end opening of the shaft 4. Clamped between the coupling sleeve 8 and a shouldered abutment 11 on the shaft 4 is the inner race 12 of an anti-friction bearing assembly which includes a single row of ball bearings 13 and an outer race 14. Annular seals 15 of conventional design are carried by the outer race 14 in wiping engagement with the inner race 12 on opposite sides of the ball bearings 13 and serve to retain lubricant therebetween and exclude foreign matter from the bearing surfaces.

To aid the seals 15 against excessive work, additional guards against the entrance of dirt are provided in the form of flat washers 16 secured on opposite sides of the inner race and projected radially outwardly into proximity to the outer race. These washers 16 serve as slingers upon shaft rotation.

The outer race 14 is received within an internal annular groove of a resilient ring 17 of molded rubber or the like, and if so desired, is bonded to the rubber ring as by means of vulcanization. The sides of the groove in the rubber ring should slant inwardly on opposite sides of the outer race 14 to provide an effective interlock to absorb axial strain. The bearing assembly, including the rubber ring, is fitted into a tubular sleeve 18 which may be welded or otherwise secured within an opening formed by the annular flange 19 on the frame bracket 20. Fastening bolts 21 secure the frame bracket to the chassis frame member 2.

At opposite ends the sleeve 18 is bell mouthed or provided with outwardly flaring formations 22 and these cooperate with a pair of rotating deflectors 23 in excluding dirt and moisture from the bearing surfaces. The deflectors 23 are each provided with a central flange 24 press fitted to the sleeve 8 and shaft 4, respectively, and at their peripheries are turned inwardly beyond and in overlapping relation with the bell shaped formations 22. The deflectors 23, by centrifugal action, deflect dirt and water splashed thereon and the bell mouthed ends 22 cooperate therewith in directing toward the inturned rim portions of the deflectors any water dripping from the underside of the vehicle body and chassis framing.

In assembling the parts the bearing is pressed into the sleeve 18 with the rubber ring 17 under moderate pressure sufficient to place compressive strain on the rubber and thereby insure firm anchorage for the outer bearing race. The final location of the bearing assembly between opposite ends of the sleeve will depend upon its relation to the propeller shaft sections 4 and 5 and the permissible endwise shifting thereof takes care of commercial inaccuracies in propeller shaft length and variations in engine, axle and frame bracket locations in the chassis frame. In use the rubber ring exerts a uniform pressure all around the outer race and its resiliency relieves the bearing from strains due either to axial thrust transmitted through the propeller shafting or to radial thrust incident to frame distortion. Upon frame distortion the rubber ring allows the bearing to rock in the frame bracket and change its relative angular position therein.

From the above description, it will be apparent that there has been provided a very simple design of central bearing support having the desirable features of low cost and few parts and which provides proper support for the shafting and takes care of the unusual operating conditions to which the parts are sometimes subjected.

I claim:

1. In combination with a propeller shaft, of an intermediate shaft supporting bearing, including a frame bracket provided with a tubular sleeve surrounding the shaft and having bell mouthed formations at opposite ends, a rubber ring carried interiorly of the sleeve to provide a resilient mounting for a shaft bearing, an anti-friction bearing having its outer race mounted in said rubber ring and its inner race fixed to the shaft, dust slingers associated with the inner race at opposite sides of the bearing assembly, and additional dust slingers cooperating with the bell shaped formations at opposite ends of the sleeve and comprising a pair of washers carried by the shaft in spaced relation to the ends of the sleeve with their peripheral portions turned inwardly beyond and in spaced overlapping relation with the bell shaped formations.

2. In combination with a propeller shaft, of an intermediate shaft supporting bearing, including a frame bracket provided with a tubular sleeve surrounding the shaft and having bell mouthed formations at opposite ends, a rubber ring carried interiorly of the sleeve to provide a resilient mounting for a shaft bearing, an anti-friction bearing having its outer race mounted in said rubber ring and its inner race fixed to the shaft, and a pair of dust slingers carried by the shaft beyond opposite ends of the sleeve and provided with an inturned rim in overlapping spaced relation with the bell mouthed formations of the sleeve.

3. In a motor vehicle having a pair of propeller shafts arranged end to end, a universal joint connecting said shafts and having a sleeve fitted to the end of one of the shafts, an anti-friction bearing assembly having its inner race clamped between said joint sleeve and a shaft shoulder, a rubber ring embracing the outer race and forming a resilient mounting for the bearing assembly and a frame bracket receiving and supporting said rubber ring.

4. A shaft center bearing, including a pressed metal support bracket having an annular lateral flange defining an opening therein, a stationary sleeve carried by said flange and provided with outwardly flared end portions, a rotatable shaft projecting through said opening, a bearing for the shaft, a rubber mounting ring interposed between the bearing and the sleeve and a pair of dust slingers carried by the shaft on opposite sides of the bearing and provided with inturned rim portions in radially spaced and axially overlapped cooperative relation with said flared end portions of the stationary sleeve.

5. A shaft center bearing, including a supporting bracket having an opening therethrough, a rotatable shaft extending through said opening, a shaft bearing, an elastic deformable ring surrounding and mounting said bearing in the bracket, cooperating relatively rotatable members on opposite sides of the bearing, one of the members being carried by the bracket and having an outturned edge and the other member being carried by the shaft and having a lateral rim overlying said outturned edge in radially spaced relation thereto.

6. A shaft center bearing, including a support bracket, tubular means fixed with the bracket against rotation, and provided with outturned end portions, a rotary shaft projected through said tubular means, a shaft bearing resiliently mounted in the bracket intermediate said outturned end portions of the tubular means and a pair of rotatable slingers carried by the shaft on opposite sides of the bearing and provided with inturned margins in overlapping radially spaced relation with said outturned end portions, respectively, of the tubular means.

7. In combination, a rotary shaft, a support bracket, a resilient mounting of the shaft in the bracket, an annular shield supported by the bracket in encompassing relation with the shaft and provided with an outturned marginal portion and a deflecting slinger mounted on the shaft for rotation therewith and provided with an annular depression to receive the marginal portion of the shield with radial clearance therebetween.

VICTOR JANTSCH.